(12) United States Patent
Kosaka

(10) Patent No.: US 11,535,299 B2
(45) Date of Patent: Dec. 27, 2022

(54) VEHICLE

(71) Applicants: TOYOTA JIDOSHA KABUSHIKI KAISHA, Aichi (JP); SUBARU CORPORATION, Tokyo (JP)

(72) Inventor: Noritaka Kosaka, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/192,890

(22) Filed: Mar. 5, 2021

(65) Prior Publication Data

US 2021/0291907 A1    Sep. 23, 2021

(30) Foreign Application Priority Data

Mar. 17, 2020    (JP) .............................. JP2020-046888

(51) Int. Cl.
| | | |
|---|---|---|
| *B62D 25/06* | (2006.01) | |
| *B62D 21/15* | (2006.01) | |
| *B60J 5/10* | (2006.01) | |
| *B62D 25/08* | (2006.01) | |

(52) U.S. Cl.
CPC .............. *B62D 25/06* (2013.01); *B60J 5/102* (2013.01); *B62D 21/152* (2013.01); *B62D 25/08* (2013.01)

(58) Field of Classification Search
CPC ................................ B62D 25/06; B62D 27/04

USPC ............. 296/56, 106, 146.8, 203.01, 203.04, 296/193.08, 187.11

See application file for complete search history.

(56) References Cited

U.S. PATENT DOCUMENTS 8,746,777 B2 *   6/2014   Iwano ................... E05F 1/1091
                                                              296/146.8

FOREIGN PATENT DOCUMENTS

| JP | H10167126 A  | 6/1998 | |
| JP | 20115912 A   | 1/2011 | |
| JP | 20115942 A   | 1/2011 | |
| KR | 20010063139 A | 7/2001 | |
| KR | 100315365 B1 * | 11/2001 | ............. B62D 25/06 |

* cited by examiner

*Primary Examiner* — Dennis H Pedder
(74) *Attorney, Agent, or Firm* — Hauptman Ham, LLP

(57) ABSTRACT

A vehicle may include: a vehicle body including an opening in a rear portion thereof; a door configured to close the opening; and a hinge swingably connecting the door to the vehicle body. The vehicle body may further include: a frame extending along an upper edge of the opening in a left-right direction of the vehicle; and a rear header located between the frame and the upper edge of the opening. The rear header may include: a hinge mounting portion to which the hinge is attached; and an intermediate portion located between the hinge mounting portion and the frame. The intermediate portion may be located below the hinge mounting portion in an up-down direction of the vehicle. The intermediate portion of the rear header may have a lower flexural strength than the frame against a collision load that acts in a front-rear direction of the vehicle.

9 Claims, 2 Drawing Sheets

VEHICLE

CROSS-REFERENCE TO RELATED APPLICATION

This application claims priority to Japanese Patent Application No. 2020-046888, filed on Mar. 17, 2020, contents of which are incorporated herein by reference.

TECHNICAL FIELD

The technology disclosed herein relates to a vehicle.

BACKGROUND

Japanese Patent Application Publication No. 2011-5912 describes a vehicle. The vehicle includes a vehicle body provided with an opening in a rear portion thereof, a door configured to close the opening, and a hinge configured to swingably connect the door to the vehicle body. The vehicle body includes a frame extending along an upper edge of the opening in a left-right direction of the vehicle and a hinge mounting portion to which the hinge is attached. The frame of the vehicle body is located between the hinge mounting portion and the upper edge of the opening of the vehicle body.

SUMMARY

In the above-described vehicle, the frame of the vehicle body is located rearward of the hinge mounting portion. Thus, when a rear-end collision occurs to the vehicle, the collision load applied from behind the vehicle is likely to be transmitted from the door to the vehicle body through the hinge mounting portion, which may result in significant deformation of the vehicle body. The disclosure herein provides a technology that diminishes deformation of a vehicle body upon a rear-end collision of a vehicle comprising a door.

A vehicle disclosed herein may comprise: a vehicle body comprising an opening in a rear portion thereof; a door configured to close the opening; and a hinge configured to swingably connect the door to the vehicle body. The vehicle body may further comprise: a frame extending along an upper edge of the opening in a left-right direction of the vehicle; and a rear header located between the frame and the upper edge of the opening. The rear header may comprise: a hinge mounting portion to which the hinge is attached; and an intermediate portion located between the hinge mounting portion and the frame and below the hinge mounting portion with respect to an up-down direction of the vehicle. The intermediate portion of the rear header may have a lower flexural strength than the frame against a collision load that acts in a front-rear direction of the vehicle.

In the above vehicle, the hinge mounting portion is located rearward of the frame of the vehicle body, and the intermediate portion of the rear header is located between the frame and the hinge mounting portion. Further, the intermediate portion of the rear header has the lower flexural strength than the frame. With this configuration, when a collision load is applied to the door upon a rear-end collision of the vehicle, the intermediate portion of the rear header is relatively easily deformed or fractured. Thus, the collision load is less likely to be transmitted to the vehicle body, and thus deformation of the vehicle body upon the rear-end collision can be diminished.

In addition, the intermediate portion of the rear header is located below the hinge mounting portion. With this configuration, the intermediate portion of the rear header is likely to undergo flexural deformation when deformed or fractured by a collision load to the door, such that the hinge mounting portion is moved upward (i.e., away from the opening of the vehicle body). Since the hinge and the door connected thereto are moved away from the opening of the vehicle body, interference of the door with the vehicle body can be prevented. Transmission of the collision load from the door to the vehicle body can be efficiently reduced. Thus, deformation of the vehicle body upon a rear-end collision can further be diminished.

DETAILED DESCRIPTION

Figure 1:
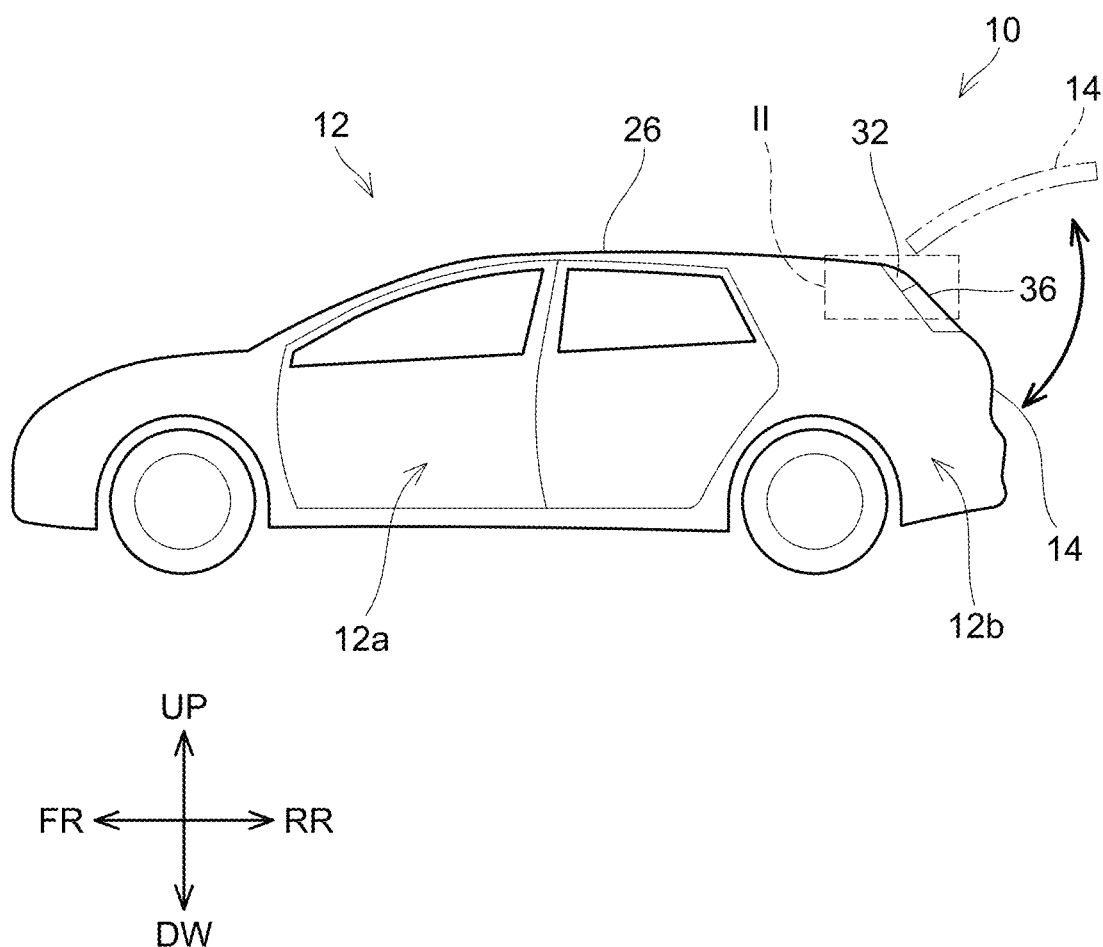
FIG. 1 schematically shows a vehicle 10 according to an embodiment.

In an embodiment of the present technology, the intermediate portion may comprise at least one bend. In this case, each of the at least one bend may extend along the left-right direction. Upon application of a collision load to the door, this configuration facilitates the intended flexural deformation of the intermediate portion of the rear header mentioned above, that is, flexural deformation by which the hinge mounting portion is moved upward (i.e., away from the opening of the vehicle body).

In the embodiment above, the at least one bend may comprise a first bend and a second bend located between the first bend and the hinge mounting portion. In this case, the first bend may be a valley fold when viewed from an outside of the vehicle body, and the second bend may be a mountain fold when viewed from the outside of the vehicle body. Upon application of a collision load to the door, this configuration facilitates the intended flexural deformation of the intermediate portion of the rear header mentioned above.

In an embodiment of the present technology, the vehicle body may further comprise: a first panel member extending from the frame to the hinge mounting portion of the rear header; and a second panel member extending from the frame to the hinge mounting portion of the rear header along the first panel member and defining a closed cross section with the first panel member in the frame. This configuration allows a portion from the frame to the hinge mounting portion of the rear header to be configured of the common panel members, and their strengths can be locally enhanced in the frame.

In addition to the above configuration, the vehicle body may further comprise a third panel member that is located between the first panel member and the second panel member and extends from the frame to the intermediate portion of the rear header. In this case, a rear end of the third panel member may be located between ends of the intermediate portion of the rear header in the front-rear direction. In this configuration, the third panel member enhances the flexural strength of the frame further. Moreover, since the rear end of the third panel member is located between the ends of the intermediate portion of the rear header in the front-rear direction, the flexural strength of the intermediate portion discontinuously varies at that location. Thus, the configuration can induce the flexural deformation of the intermediate portion of the rear header upon application of a collision load to the door.

In the embodiment described above, each of the first panel member and the second panel member may comprise a bend along the rear end of the third panel member. This configuration can more efficiently induce the flexural deformation of the intermediate portion of the rear header upon application of a collision load to the door.

In an embodiment of the present technology, the vehicle body may further comprise a roof panel that extends forward from the upper edge of the opening and covers the first panel member and the second panel member.

In the drawings, FR indicates a front direction of a front-rear direction of a vehicle 10, and RR indicates a rear direction of the front-rear direction of the vehicle 10. Further, UP indicates an up direction of an up-down direction of the vehicle 10, and DW indicates a down direction of the up-down direction of the vehicle 10. In the disclosure herein, the front-rear direction of the vehicle 10, the left-right direction of the vehicle 10, and the up-down direction of the vehicle 10 may be simply termed the front-rear direction, the left-right direction, and the up-down direction, respectively. Here, the left-right direction of the vehicle 10 means a direction perpendicular to both the front-rear direction and the up-down direction.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Figure 2:
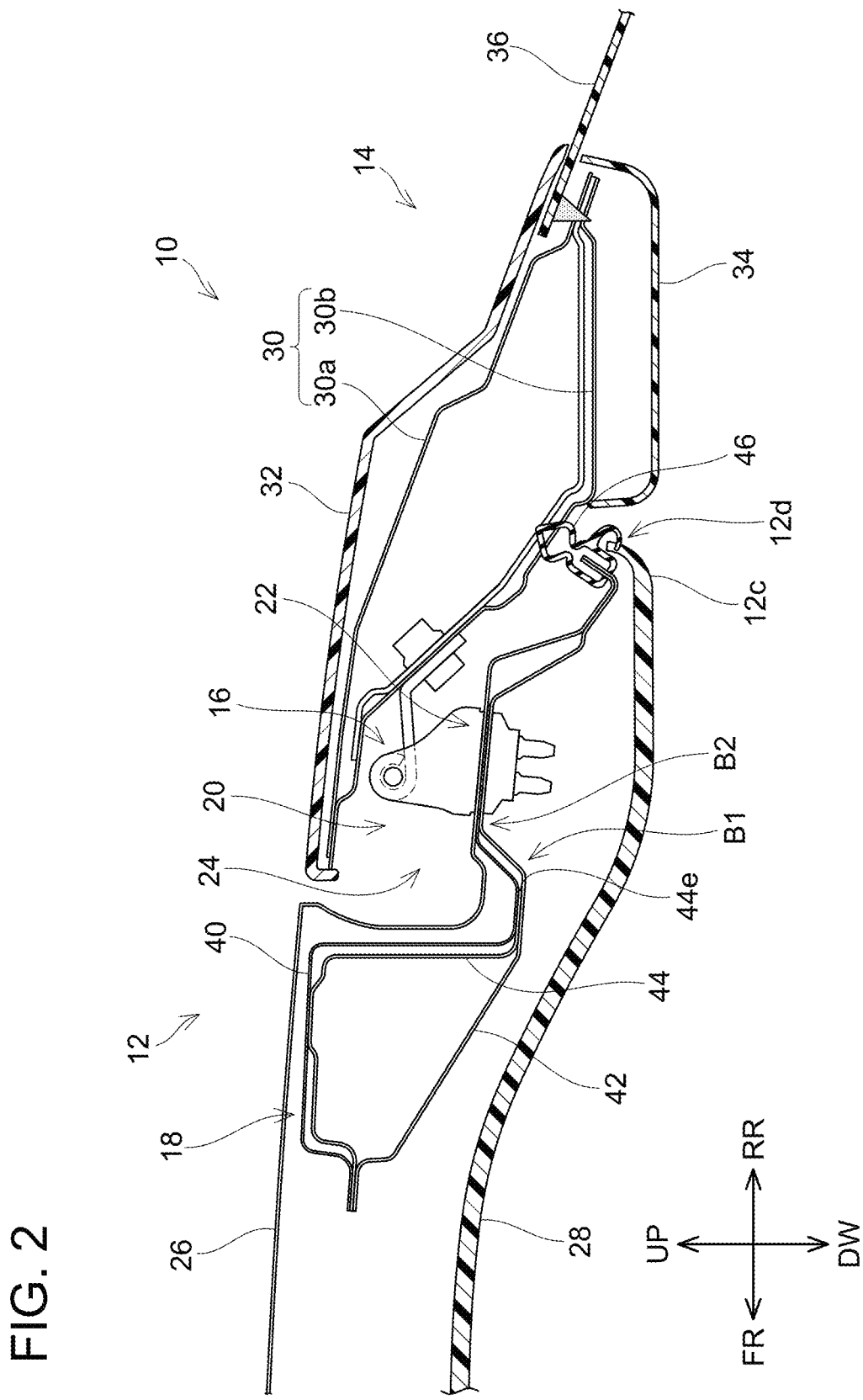
FIG. 2 shows a cross-sectional view of a part II in FIG. 1.

Referring to FIGS. 1 and 2, a vehicle 10 according to an embodiment will be described. As shown in FIGS. 1 and 2, the vehicle 10 includes a vehicle body 12, a back door 14, and a hinge 16. The vehicle body 12 is constituted of steel, aluminum alloy, or the like, although not limited thereto. The vehicle body 12 defines a cabin 12a and a luggage space 12b therein. The luggage space 12b is defined in a rear portion of the vehicle body 12. The rear portion of the vehicle body 12 includes a back door opening 12c that is open rearward. The back door 14 is a movable member configured to open and close the back door opening 12c. The back door 14 is attached to the vehicle body 12 via the hinge 16. The hinge 16 connects the back door 14 swingably to the vehicle body 12. It should be noted that the hinge 16 herein broadly means any connector configured to connect two members with each other such that these members are pivotable within a limited angle range.

As shown in FIG. 2, the vehicle body 12 includes a frame 18 and a rear header 20. The frame 18 extends along an upper edge 12d of the back door opening 12c in a left-right direction of the vehicle 10. The rear header 20 is located between the frame 18 and the upper edge 12d of the back door opening 12c. The rear header 20 includes a hinge mounting portion 22 and an intermediate portion 24. The hinge 16 is fixed to the hinge mounting portion 22 with a bolt, for example.

The intermediate portion 24 is located between the hinge mounting portion 22 and the frame 18. Further, the intermediate portion 24 is located below the hinge mounting portion 22 in an up-down direction of the vehicle 10. The intermediate portion 24 of the rear header 20 has a lower flexural strength than the frame 18 against a collision load that acts in a front-rear direction of the vehicle 10. The hinge mounting portion 22 includes a plurality of bends B1, B2. Each of the bends B1, B2 extends along the left-right direction. The plurality of bends B1, B2 includes a first bend B1 and a second bend B2. The second bend B2 is located between the first bend B1 and the hinge mounting portion 22. The first bend B1 is a valley fold when viewed from the outside of the vehicle body 12, and the second bend B2 is a mountain fold when viewed from the outside of the vehicle body 12.

The vehicle body 12 includes a plurality of panel members 40, 42, and 44, and a roof panel 26. The frame 18 is configured using the plurality of panel members 40, 42, 44. The rear header 20 is configured using the plurality of panel members 40, 42, and 44, and the roof panel 26. The plurality of panel members 40, 42, 44 includes a first panel member 40, a second panel member 42, and a third panel member 44. The first panel member 40 extends from the frame 18 to the hinge mounting portion 22 of the rear header 20. The first panel member 40 bends at the first bend B1 and the second bend B2 of the intermediate portion 24.

The second panel member 42 extends from the frame 18 to the hinge mounting portion 22 of the rear header 20 along the first panel member 40. Further, the second panel member 42 extends from the frame 18 to the upper edge 12d of the back door opening 12c. The second panel member 42 bends at the first bend B1 and the second bend B2 of the intermediate portion 24. The second panel member 42 defines a closed cross section with the first panel member 40 in the frame 18.

The third panel member 44 is located between the first panel member 40 and the second panel member 42. The third panel member 44 extends from the frame 18 to the intermediate portion 24 of the rear header 20. A rear end 44e of the third panel member 44 is located between ends of the intermediate portion 24 of the rear header 20 in the front-rear direction. Specifically, the rear end 44e of the third panel member 44 is located at the first bend B1 of the intermediate portion 24.

The roof panel 26 is exposed to the outside of the vehicle body 12 and extends forward from the upper edge 12d of the back door opening 12c. The roof panel 26 covers the first panel member 40 and the second panel member 42. The roof panel 26 is joined to the second panel member 42 at the upper edge 12d of the back door opening 12c. A weatherstrip 46 is attached to the upper edge 12d of the back door opening 12c. When the back door 14 is closed in the vehicle 10, the weatherstrip 46 fills a clearance between the back door 14 and the upper edge 12d of the back door opening 12c of the vehicle body 12. The weatherstrip 46 is constituted of an elastic material such as a resin material.

The vehicle body 12 includes a head lining 28 that is opposed to the roof panel 26 with the first panel member 40 and the second panel member 42 interposed therebetween. The head lining 28 extends forward from the upper edge 12d of the back door opening 12c. The head lining 28 defines height dimensions of the cabin 12a and the luggage space 12b. A rear end of the head lining 28 is attached to the upper edge 12d of the back door opening 12c via the weatherstrip 46. In an example, the head lining 28 is constituted of a resin material.

The back door 14 includes a back door body 30, an exterior panel 32, an interior panel 34, and a rear window 36. The exterior panel 32 is attached to an outer surface of the back door body 30 and exposed to the outside of the vehicle 10. The interior panel 34 is attached to an inner surface of the back door body 30 and disposed inside the vehicle 10. An upper edge of the rear window 36 is located between the back door body 30 and the exterior panel 32. In an example, the rear window 36 is attached to a lower edge of the back door body 30, for example, via an adhesive material.

The back door body 30 is configured of a plurality of panel members 30a, 30b. The plurality of panel members 30a, 30b includes a back door outer panel 30a and a back door inner panel 30b. The back door outer panel 30a and the back door inner panel 30b define a closed space extending in the left-right direction. This provides enhanced rigidity to the back door body 30. The hinge 16 is attached to the back door inner panel 30b with a bolt. In an example, the back door inner panel 30b is configured of two panel members. These panel members of the back door inner panel 30b overlap with each other at least at the portion of the back door inner panel 30b to which the hinge 16 is attached. This provides further enhanced rigidity to the portion of the back door inner panel 30b to which the hinge 16 is attached. The back door body 30 is constituted of steel, although not limited thereto.

The interior panel 34 covers at least a part of the back door inner panel 30b. Although not shown, the interior panel 34 is attached to the back door inner panel 30b via a pin, for example. The exterior panel 32 covers the back door outer panel 30a of the back door body 30. Although not limited, the exterior panel 32 may include a stair and a spoiler may be attached to the stair.

In a vehicle, it is generally required to diminish deformation of a vehicle body upon a rear-end collision. In particular, the vehicle 10 according to the embodiment includes the back door 14, thus when a rear-end collision load is transmitted from the back door 14 to the vehicle body 12 through the hinge mounting portion 22, the vehicle body 12 could thereby be deformed significantly. In this regard, in the vehicle 10 according to the embodiment, the hinge mounting portion 22 is located rearward of the frame 18 of the vehicle body 12 and the intermediate portion 24 of the rear header 20 is located between the frame 18 and the hinge mounting portion 22. Further, the intermediate portion 24 of the rear header 20 has a lower flexural strength than the frame 18. This configuration allows the intermediate portion 24 of the rear header 20 to relatively easily be deformed or fractured when a rear-end collision occurs to the vehicle 10 and the collision load is applied to the back door 14. Thus, the collision load is less likely to be transmitted to the vehicle body 12 from the back door 14 and deformation of the vehicle body 12 is thus diminished in the rear-end collision.

In addition, the intermediate portion 24 of the rear header 20 is located below the hinge mounting portion 22. With this configuration, the intermediate portion 24 of the rear header 20 is likely to undergo flexural deformation such that the hinge mounting portion 22 is moved upward (i.e., away from the back door opening 12e of the vehicle body 12), when the intermediate portion 24 of the rear header 20 is deformed or fractured by a collision load onto the back door 14. Since the hinge 16 and the back door 14 connected thereto are moved away from the back door opening 12c of the vehicle 12, interference of the back door 14 with the vehicle body 12 can be reduced. Transmission of the collision load from the back door 14 to the vehicle body 12 is reduced effectively. Thus, deformation of the vehicle body 12 upon a rear-end collision is further diminished.

In the vehicle 10 according to the embodiment, a relatively small collision load is transmitted from the back door 14 to the vehicle body 12. Thus, an influence of a collision load transmission path from the back door 14 to the vehicle body 12 on collision safety of the vehicle body 12 is also relatively small. In other words, the collision safety of the vehicle body 12 is characterized mainly by a platform configuring a lower part of the vehicle body 12. Thus, assuming that multiple vehicles 10 are designed to each include the same platform of the vehicle body 12 and a different configuration of the back door 14, these multiple types of vehicles have substantially the same level of collision safety. Since there is no need to considerably redesign the vehicle body 12 depending on the configuration of the back door 14, various types of vehicle 10 can be relatively easily designed by using the same platform.

In the vehicle 10 according to the embodiment, the intermediate portion 24 includes the plurality of bends B1, B2, and each of the bends B1, B2 extends in the left-right direction of the vehicle 10. Upon application of a collision load to the back door 14, this configuration facilitates the intended flexural deformation of the intermediate portion 24 of the rear header 20 mentioned above, that is, flexural deformation by which the hinge mounting portion 22 is moved upward (i.e., away from the back door opening 12c of the vehicle body 12). No limitations are placed on the number of the bends B1, B2 of the intermediate portion 24, and it suffices that the intermediate portion 24 includes at least one bend.

In the embodiment, the plurality of bends B1, B2 includes the first bend B1 and the second bend B2 located between the first bend B1 and the hinge mounting portion 22. The first bend B1 is a valley fold when viewed from the outside of the vehicle body 12, and the second bend B2 is a mountain fold when viewed from the outside of the vehicle body 12. Upon application of a collision load to the back door 14, this configuration facilitates the intended flexural deformation of the intermediate portion 24 of the rear header 20 mentioned above.

In the embodiment, the vehicle body 12 includes the first panel member 40 extending from the frame 18 to the hinge mounting portion 22 of the rear header 20 and the second panel member 42 extending from the frame 18 to the hinge mounting portion 22 of the rear header 20 along the first panel member 40. The second panel member 42 defines a closed cross section with the first panel member 40 in the frame 18. This configuration allows a portion from the frame 18 to the hinge mounting portion 22 of the rear header 20 to be configured of the common panel members, and their strength can be locally enhanced in the frame 18.

Additionally, in the embodiment, the vehicle body 12 includes the third panel member 44 that is located between the first panel member 40 and the second panel member 42 and extends from the frame 18 to the intermediate portion 24 of the rear header 20. The rear end 44e of the third panel member 44 may be located between the ends of the intermediate portion 24 of the rear header 20 in the front-rear direction. In this configuration, the third panel member 44 enhances the flexural strength of the frame 18 further. Moreover, since the rear end 44e of the third panel member 44 is located between the ends of the intermediate portion 24 of the rear header 20 in the front-rear direction, the flexural strength of the intermediate portion 24 discontinuously varies at that location. Thus, the configuration can induce the flexural deformation of the intermediate portion 24 of the rear header 20 upon application of a collision load to the back door 14.

In the embodiment, each of the first panel member 40 and the second panel member 42 includes the bends B1, B2 along the rear end 44e of the third panel member 44. This configuration can more efficiently induce the flexural deformation of the intermediate portion 24 of the rear header 20 upon application of a collision load to the back door 14.

What is claimed is:

1. A vehicle, comprising:
   a vehicle body comprising an opening in a rear portion thereof;
   a door configured to close the opening; and
   a hinge swingably connecting the door to the vehicle body,
   wherein
   the vehicle body further comprises:
      a frame extending along an upper edge of the opening in a left-right direction of the vehicle; and
      a rear header located between the frame and the upper edge of the opening,
   the rear header comprises:
      a hinge mounting portion to which the hinge is attached; and
      an intermediate portion located between the hinge mounting portion and the frame, the intermediate portion being located below the hinge mounting portion in an up-down direction of the vehicle, and
   the intermediate portion of the rear header has a lower flexural strength than the frame against a collision load that acts in a front-rear direction of the vehicle,
   wherein the vehicle body further comprises:
      a first panel member extending from the frame to the hinge mounting portion of the rear header; and
      a second panel member extending from the frame to the hinge mounting portion of the rear header along the first panel member and defining a closed cross section with the first panel member in the frame.

2. The vehicle according to claim 1, wherein
   the intermediate portion comprises at least one bend, and each of the at least one bend extends along the left-right direction.

3. The vehicle according to claim 2, wherein
   the at least one bend comprises a first bend and a second bend located between the first bend and the hinge mounting portion, and
   the first bend is a valley fold when viewed from an outside of the vehicle body, and
   the second bend is a mountain fold when viewed from the outside of the vehicle body.

4. The vehicle according to claim 3, wherein
   the vehicle body further comprises a third panel member that is located between the first panel member and the second panel member and extends from the frame to the intermediate portion of the rear header, and
   a rear end of the third panel member is located between ends of the intermediate portion of the rear header in the front-rear direction.

5. The vehicle according to claim 4, wherein each of the first panel member and the second panel member comprises a bend along the rear end of the third panel member.

6. The vehicle according to claim 3, wherein the vehicle body further comprises a roof panel that extends forward from the upper edge of the opening and covers the first panel member and the second panel member.

7. The vehicle according to claim 1, wherein
   the vehicle body further comprises a third panel member that is located between the first panel member and the second panel member and extends from the frame to the intermediate portion of the rear header, and
   a rear end of the third panel member is located between ends of the intermediate portion of the rear header in the front-rear direction.

8. The vehicle according to claim 7, wherein each of the first panel member and the second panel member comprises a bend along the rear end of the third panel member.

9. The vehicle according to claim 1, wherein the vehicle body further comprises a roof panel that extends forward from the upper edge of the opening and covers the first panel member and the second panel member.

* * * * *